United States Patent
Cohen

(10) Patent No.: US 6,295,615 B1
(45) Date of Patent: Sep. 25, 2001

(54) AUTOMATIC RESTORATION OF COMMUNICATION CHANNELS

(75) Inventor: Aaron Yakov Cohen, Potomac, MD (US)

(73) Assignee: Sprint Communications Company, L. P., Kansas City, MO (US)

( * ) Notice: Subject to any disclaimer, the term of this patent is extended or adjusted under 35 U.S.C. 154(b) by 0 days.

(21) Appl. No.: 08/385,574

(22) Filed: Feb. 8, 1995

Related U.S. Application Data

(63) Continuation of application No. 07/805,340, filed on Dec. 9, 1991, now abandoned.

(51) Int. Cl.[7] .................................................. G06F 11/00
(52) U.S. Cl. .............................................................. 714/712
(58) Field of Search .......................... 371/8.2, 8.1, 20.1, 371/7, 14, 16, 16.1; 395/575; 375/10; 455/8; 340/825.01; 714/712, 6

(56) References Cited

U.S. PATENT DOCUMENTS

| | | | |
|---|---|---|---|
| Re. 33,900 | | 4/1992 | Howson ................................ 370/105 |
| 3,991,407 | * | 11/1976 | Jordan, Jr. et al. ................ 340/172.5 |
| 4,119,815 | | 10/1978 | Frankfort et al. .................. 179/175.3 |
| 4,348,554 | | 9/1982 | Asmuth ..................................... 179/18 |
| 4,371,754 | * | 2/1983 | De et al. ........................... 179/18 EE |
| 4,435,704 | * | 3/1984 | Hashimoto et al. ............ 340/825.01 |
| 4,486,882 | | 12/1984 | Piret et al. ............................... 371/45 |
| 4,625,314 | | 11/1986 | Witte ....................................... 371/68 |
| 4,674,085 | | 6/1987 | Aranguren et al. . |
| 4,774,703 | | 9/1988 | Force et al. ............................ 370/16 |
| 4,780,869 | | 10/1988 | Engdahl et al. ........................ 370/16 |
| 4,794,604 | | 12/1988 | Gorshe .................................... 371/57 |
| 4,819,225 | | 4/1989 | Hochstein ............................... 370/16 |
| 4,835,763 | | 5/1989 | Lau ......................................... 370/16 |
| 4,847,837 | | 7/1989 | Morales et al. .......................... 371/8 |

(List continued on next page.)

OTHER PUBLICATIONS

"Digital Cross–Connect System Requirements and Objectives," Bell Communications Research, Technical Reference, TR–TSY 000170, Issue 1, Nov. 1975 ("Bellcore publication").

"Digital Cross–Connect System Requirements and Objectives", Bell Communications Research, Technical Reference, TR–TSY–000170, Issue1, Nov. 1985 ("Bellcore publications").

"The Book on ESP", Verilink Corporation, 1986.

"Extended Superframe Format (ESF), Interface Specifications", Bell Communications Research, Technical Reference, TR–TSY–000194, Issue 1, Jul. 1987 ("Bellcore publication No. 2").

"New Product Preview Model 4701 DSI Automatic Protections Switch," Digital Transmission System, Inc.

Primary Examiner—Phung M. Chung
(74) Attorney, Agent, or Firm—Harley R. Ball; Steven J. Funk

(57) ABSTRACT

A device (310, 320), in its receiver aspect, interconnects a high-rate terminal, e.g. DS1, link transmitting outgoing fractional DS1, e.g. DS0, channels destined for a customer site with autonomous first and second networks (301, 302) composed of high-rate links (112, 312) propagating incoming fractional DS1 channels. Each network is adapted to insert a fault indication signal in any channel affected by a fault condition. The device monitors each incoming channel from each network for a fault indication signal and switches fractional DS1 channels from the network manifesting a fault condition to the alternate network, thereby maintaining essentially uninterrupted digital service to the customer site. In its transmitter aspect, the device transmits replicated versions of channels supplied by the terminal link simultaneously onto both the first and second networks, thereby providing a substantially identical device connected at the other end of the networks with corresponding incoming high-rate link signals.

5 Claims, 4 Drawing Sheets

U.S. PATENT DOCUMENTS

| | | | |
|---|---|---|---|
| 4,852,103 | 7/1989 | Fujimura | 371/55 |
| 4,903,125 * | 2/1990 | Parker | 358/140 |
| 4,924,500 | 5/1990 | Lewis et al. | 379/201 |
| 4,943,999 | 7/1990 | Ardon | 379/221 |
| 4,964,120 | 10/1990 | Mostashari | 370/16 |
| 4,972,415 | 11/1990 | Walter et al. | 371/36 |
| 4,993,014 | 2/1991 | Gordon | 370/16 |
| 4,993,015 | 2/1991 | Fite, Jr. | 370/16 |
| 5,115,449 | 5/1992 | Lockyer et al. | 375/3 |
| 5,153,578 | 10/1992 | Izawa et al. | 340/825.21 |
| 5,155,678 * | 10/1992 | Fukumoto et al. | 395/425 |
| 5,200,950 | 4/1993 | Foglar et al. | 370/16 |
| 5,200,963 * | 4/1993 | Chau et al. | 371/68.1 |
| 5,241,534 | 8/1993 | Omuro et al. | 370/16 |
| 5,315,581 | 5/1994 | Nakano et al. | 3770/16 |
| 5,343,477 | 8/1994 | Yamada | 371/8.2 |

\* cited by examiner

AUTOMATIC RESTORATION OF COMMUNICATION CHANNELS

This application is a continuation of application Ser. No. 07/805,340, filed on Dec. 9, 1991, and now abandoned.

The invention relates to digital communication networks and, more specifically, to restoration circuitry and a concomitant methodology to provide high availability communication channels over a digital network.

BACKGROUND OF THE INVENTION

With modern telecommunications networks, a customer such as a business customer may select from an array of communication services aimed at providing cost-effective connections to geographically-dispersed sites maintained by the customer. The various available alternatives range, at one extreme, from ubiquitous direct dialing over the public network to, at the other extreme, specially provisioned private networks. Because of the vagaries of direct dialing, such as call blocking and connect-time cost, a customer with critical communication requirements most often selects the private network option. In particular, there has recently been a demand for large private data networks to connect, for example, numerous terminal devices such as reservation terminals to an arrangement of centrally located, fault-tolerant host computers so as to service consumer transactions. Data networks are generally implemented on private network facilities because, as exemplified above, computer applications necessitate continuous, on-line connections of terminals to centralized computers.

One common method of implementing a private line network is to interconnect various customer sites with DS1 digital facilities wherein numerous channels are multiplexed to generate a DS1 signal suitable for carriage over the high-rate links. A channel may have more than one DS0 (i.e. N×DS0, where $1 \leq N \leq 24$). Each channel embedded in the DS1 will hereinafter be referred to as a fractional DS1 channel. At the destination end (far end), the high-rate signals are demultiplexed to recover the fractional DS1 channels. Oftentimes, the DS1 facilities are provided by a common carrier over carrier-owned digital facilities on a long-term or semi-permanent basis. DS1 facilities are provisioned by the common carrier through static cross-connect switches generally referred to as a Digital Access and Cross Connect System (DACCS). Unlike telephone-carrier switches which handle telephone call setups, a DACCS establishes routes which may be connected for years.

Efficient use of DS1 facilities requires channel grooming. Because of channel grooming, the fractional DS1 channels which are carried over each DS1 link may not all be derived from the same customer site. Specifically, the fractional DS1 channels that form an out-going DS1 signal from a DACCS are usually composed of fractional DS1 channels that originate from a plurality of in-coming DS1 facilities that come from different customer sites. Typically, facility failures in private networks require restoration efforts that are correspondingly sophisticated and time-consuming. Accordingly, facility engineers have sought techniques to provide for efficient and automated restoration of facilities when deleterious service conditions are detected.

Recently, a service has been introduced by one interexchange carrier which provides switched digital data service at fractional DS1 speeds. In using the service, a customer is able to establish a back up dial-up link to restore a failed private line fractional DS1 channel. However, such a service has the disadvantage of blocking, that is, a link between the end points is not always available. Moreover, it takes at least a few seconds to establish a connection over such a link each time a dial-up is attempted. In the period of a few seconds, a significant loss of data can occur.

A need exists in the art for a relatively simple technique for efficiently and automatically restoring telecommunications service over a fractional DS1 channel while providing essentially uninterrupted communications in the event that a DS1 facility, which carries that channel in a private line network, fails.

SUMMARY OF THE INVENTION

These deficiencies as well as other shortcomings and limitations are obviated, in accordance with the present invention, by a device that couples to pairs of redundant digital networks and switches individual channels, e.g., bi-directional fractional DS1 channels, to the alternative network whenever errors, such as failures of a DS1 facility, are detected in the active network.

Broadly speaking, with respect to the circuitry aspect of the present invention, a pair of devices are situated at near and far ends of a digital link such as a fractional DS1 channel. Each of these devices includes: detection circuitry to detect the presence of a fault indication signal, such as a digital access cross-connect system (DACCS)-generated trouble code, in any of the fractional DS1 channels arriving over the network pair; and switching circuitry to transfer the corresponding fractional DS1 channels having the trouble code from the active network to fractional DS1 channels in the alternate network. The use of paired devices spanning both ends of the fractional DS1 channel ensures that both directions of propagation are protected from fault conditions that could arise within either network and adversely affect transmission in either direction over either one of the links. In addition, each device also includes transmitter circuitry to transmit two identical versions of data generated by terminal equipment which then are transmitted to the far-end over primary and secondary networks.

In a particular embodiment, each device relies on detecting a so-called DACCS "trouble code" which is inserted by a digital access cross-connect system on all outgoing DS0s at the occurrence of a DS1 facility failure and then, based upon the presence of this code, automatically switching a fractional DS1 channel from an active route to a corresponding fractional DS1 channel in the other DS1 provided by the alternate network in order to restore service. It has been known for several years that a DACCS will automatically insert a pre-defined trouble code in each outgoing DS0 which is affected by a facility failure. However, the art appears to be devoid of any teachings showing that these codes have ever been commercially used in switching between primary and alternate routes for two redundant facilities, each of which is carried through a separate network, in order to restore telecommunications service in the event the active route fails.

The invention further comprises a digital device for interconnecting a terminal link to both first and second communication networks. Both the terminal link, and the first and second communication networks are arranged to propagate a plurality of corresponding channels, wherein each of the communication networks is arranged to generate and then to transmit a fault indication signal over any of its corresponding channels upon detection of a fault condition affecting any of the corresponding channels in the first or second networks. The first network is initially the active network and the second network is initially the alternate network. The device comprises a means, responsive to the terminal link, for transmitting the channels carried by the terminal link simultaneously over both the first network and the second network. The device has a means, responsive to both the first network and the second network and coupled to the terminal link, for monitoring each channel in the active network to determine the presence of the fault indication signal. Upon detection of the fault indication signal, the responsive device replaces each channel from the active network having the fault indication signal with the corresponding channel from the alternate network so as to thereby supply the terminal link with high availability channels.

The invention further comprises a digital network having a plurality of channels for interconnecting a near end and far end customer transceivers, wherein one end of the channel is the near end and the other end is the far end. The transceivers transmit fractional DS1 communication channels to and receive fractional DS1 communication channels from the digital network. The digital network comprises autonomous primary and secondary digital communication networks each composed of DS1 links arranged to propagate a plurality of the fractional DS1 channels. Each of the communication networks being arranged to generate and then transmit a fault indication signal over any of the fractional DS1 channels upon detection of a fault condition affecting said any of the fractional DS1 channels. The primary network is active initially and the secondary network is in standby initially. A first circuit means is coupled to the near end customer transceiver and one end of both said primary and secondary networks, and a second circuit means is coupled to the far end customer transceiver and the other end of both said primary and secondary networks. Each of the circuit means comprise a means for transmitting simultaneous versions of the fractional DS1 channels over the first and second communication networks, a means for sensing the fault indication signal on any of the fractional DS1 channels on the active network, and a means for restoring any of the fractional DS1 channels having the fault indication signal by selecting the corresponding fractional DS1 channel from the standby network upon sensing of the fault indication signal.

In addition the invention further includes a communications network comprising a first and a second communication path one of which is an active communication path and the other being a stand-by path. The network comprises a means for simultaneously transmitting information over the first and the second communication paths and a means for receiving transmitted information from the active communication path. The network has a means for monitoring the active communication path to determine the presence of a fault indication signal, and upon detection of the fault indication signal, the network has a means for switching the active communication path having the fault indication signal with the stand-by path, such that the stand-by path is the active communication path until a fault indication signal is detected in the then active communication path.

Another embodiment of the invention is a method of transmitting information comprising the steps of simultaneously transmitting information over a first and a second communication path, one of which is an active communication path and the other being a stand-by path. The method further comprises monitoring the active communication path to determine the presence of a fault indication signal, and upon detection of the fault indication signal, switching the active communication path having the fault indication signal with the stand-by path, such that the stand-by path is the active communication path until a fault indication signal is detected in the then active communication path.

The invention also includes a method for interconnecting a terminal link to both first and second communication networks wherein both the terminal link and each of the communication networks are arranged to propagate a plurality of corresponding channels. Each of the communication networks are arranged to generate and then to transmit a fault indication signal over any of its corresponding channels upon detection of a fault indication condition affecting any of the corresponding channels in the first links or in the second links. The first network is initially the active network and the second network is initially the alternate network. The method comprising the steps of transmitting the channels carried by the terminal link simultaneously over both the first network and the second network, monitoring each channel in the active network to determine the presence of the fault indication signal, and upon detection of the fault indication signal, replacing each channel from the active network having the fault indication signal with the corresponding channel from the alternate network so as to thereby supply the terminal link with high availability channels.

BRIEF DESCRIPTION OF THE DRAWINGS

The teachings of the present invention may be readily understood by considering the following detailed description in conjunction with the accompanying drawings, in which.

To facilitate understanding, identical reference numerals have been used, where possible, to denote identical elements that are common to various figures.

DETAILED DESCRIPTION

To place the detailed description of the present invention in perspective, it is instructive to first gain a basic understanding of the telecommunications environment in which the present invention operates. This approach has the advantage of introducing notation and terminology which will aid in elucidating the various detailed aspects of the present invention. Thus, the first part of the description focuses on a high-level discussion of the digital network hierarchy pertinent to the inventive subject matter; after which, the circuitry aspects of the present invention, as well as the concomitant operational methodology, are presented in detail.

A. Overview

Figure 1:
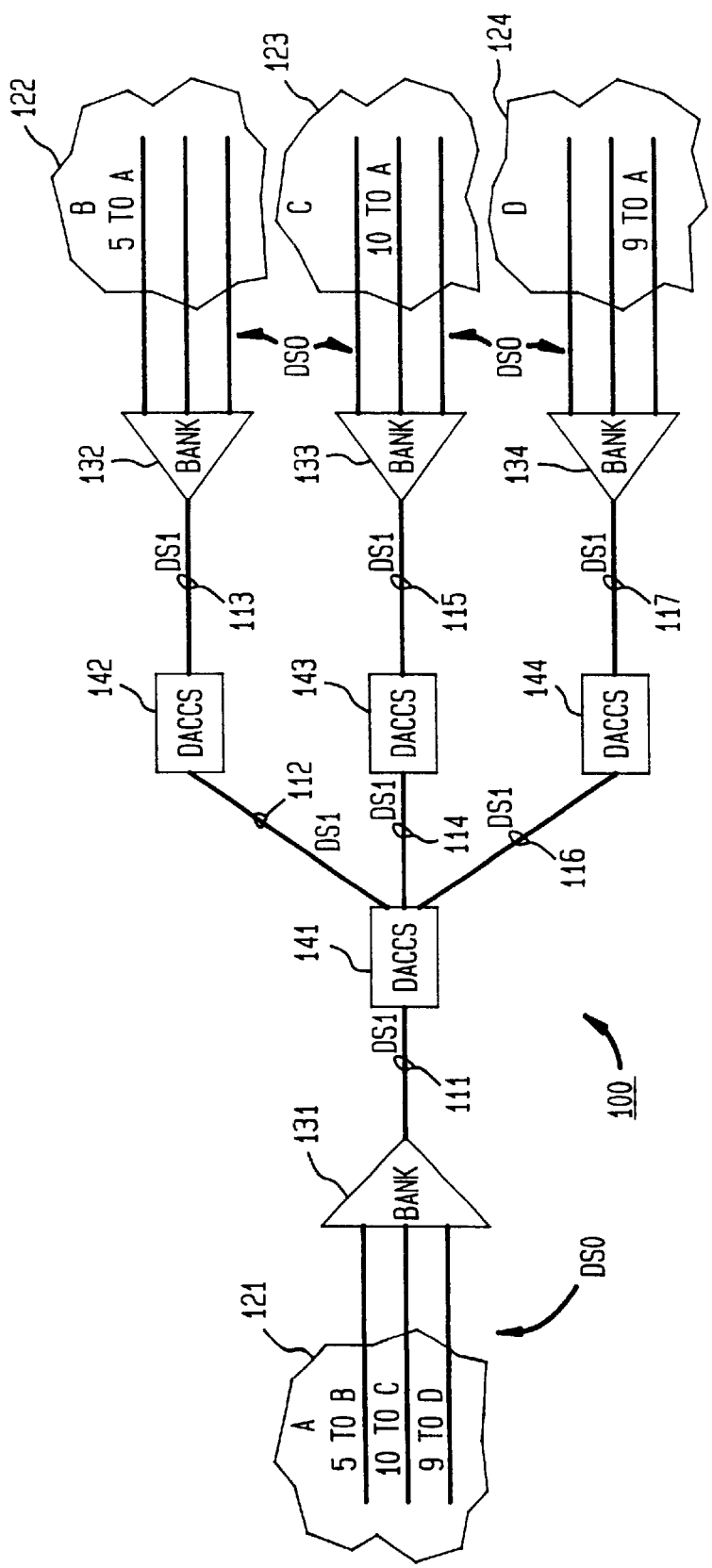
FIG. 1 illustrates a prior art digital network facility wherein a number of customer sites are interconnected by an arrangement of channel banks and digital access cross-connects systems (DACCSs) coupled by DS1 facilities.

With reference to prior art private network 100 of FIG. 1, the digital network facilities exemplified by links 111–117 are high-rate links which serve as backbone links to interconnect geographically-dispersed customers sites 121–124 (also referred to sites A, B, C, and D, respectively). In the digital network hierarchy, 2 such a high-rate link is commonly referred to as a DS1 link. The DS1 signal is formed by time-division multiplexing twenty-four DS0s that are to be carried over an associated DS1 link. Each DS0 signal is a 64 kbps channel. An exemplary DS1 signal is a sequence of 193 bit frames, each frame being formed by juxtaposing the 8-bit patterns from twenty-four fractional DS1 signals, plus one framing bit. It is also noted that a DS0 may carry either digital data or digitized voice.

The various DS1 links depicted in FIG. 1 are bi-directional and each has a different set of terminating equipment. For instance, link 111 has digital channel bank 131 as one termination and digital access cross-connect system (DACCS) 141 as a second termination; links 113, 115, and 117 are terminated similarly. Broadly speaking, each DACCS is a semi-permanent switch which redistributes twenty-four individual DS0s carried over the DS1 link received on one side of the DACCS to one or more outgoing DS1 links on the other side of the DACCS, as discussed in more detail shortly. DACCS pair 141 and 142 terminate link 112; DACCS pairs 141 and 143, and 141 and 144, respectively, terminate links 114 and 116. DACCS 141 also terminates one end of DS1 link 111, while DACCS 142, 143 and 144 also terminate one end of respective DS1 links 113, 115 and 117.

Each digital channel bank, of which four (banks 131, 132, 133 and 134 are specifically shown), interconnects up to twenty-four lower-level fractional DS1 channels of each specific site to a DS1 link in the following manner, depending on whether the specific site is considered to be functioning in its source mode or destination mode. By way of example, channel bank 131 and site A are considered as representative: (i) with site A as a source, a transceiver (not shown) at site A originates up to twenty-four fractional DS1 channels which are multiplexed by channel bank 131 into a composite signal suitable for propagation over DS1 link 111; (ii) with the transceiver at site A as a destination, channel bank 131 de-multiplexes the incoming DS1 signal on link 111 to produce up to twenty-four independent fractional DS1 channels. Thus, channel bank 131 is bi-directional, having incoming ports connected to site A and an outgoing port connected to DS1 link 111 for channels originating at site A, whereas for channels terminating at site A, an incoming port of channel bank 131 is connected to DS1 link 111 and outgoing ports are connected to site A.

In a similar manner, each DS1 link has incoming and outgoing ends which are defined by the direction of signal propagation on the DS1 link. For example, the incoming and outgoing ends of link 111 connect to channel bank 131 and DACCS 141, respectively, for signals originating at site A. Accordingly, each link 111–117, channel bank 131–134, or DACCS 141–144 supports full-duplex transmission. In one implementation of a DS1 link, the communication medium is paired wire cable; a DS1 link utilizes two wire-pairs to support the bi-directional propagation—one pair for each direction.

In modern private DS1 private networks, not all of the fractional DS1 channels which originate at a near-end location terminate at the same location at the far end. This is exemplified in FIG. 1 wherein, at site A, illustratively five DS0s are destined for site B, ten DS0s for site C, with the remaining nine DS0s having site D as their destination. Routing is accomplished via interposed DACCS 141–144. For DS0s originating at site A, the incoming port of DACCS 141 receives the full complement of twenty-four DS0s over link 111 and partitions this DS1 into groups of five, ten, and nine DS0s for distribution over links 112, 114, and 116, respectively. At the far end of link 112, the five DS0s destined for site B are switched through DACCS 142 and then propagated over link 113 and, after de-multiplexing by channel bank 132, to site B. Similarly, at the far end of link 114, the ten DS0s destined for site C are switched through DACCS 143 and then propagated over link 115 and, after de-multiplexing by channel bank 133, to site C. Finally, at the far end of link 116, the nine DS0s destined for site D are switched through DACCS 144 and then propagated over link 117 and, after demultiplexing by channel bank 134, to site D.

Because of the interconnection arrangement of network 100, a single, isolated failure in this network may affect only a fraction of the DS0s originating or terminating at a given site. For example, a break in DS1 link 113 between DACCS 142 and site B affects only five DS0s at site A. In order to report a facility failure downstream, each DACCS 141–144 is implemented to insert a so-called DACCS "trouble code" in all outgoing DS0s which are cross-connected to DS1 port detecting a facility failure. In this regard, reference is made to the Technical Reference TR-TSY-000170, Issue 1, "Digital Cross-Connect Requirements and Objectives", Bell Communications Research (Bellcore) November, 1985; this document is incorporated herein by reference. This DACCS code is a pre-defined eight bit pattern. The user can select one of the two standard trouble codes, namely, TRB=11100100, or MUX=00011010. Also, DACCS allows selection of any 8-bit pattern for insertion into the outgoing DS0s during a failure. This "trouble code" generating aspect of each DACCS is shown with reference to FIG. 2.

Figure 2:
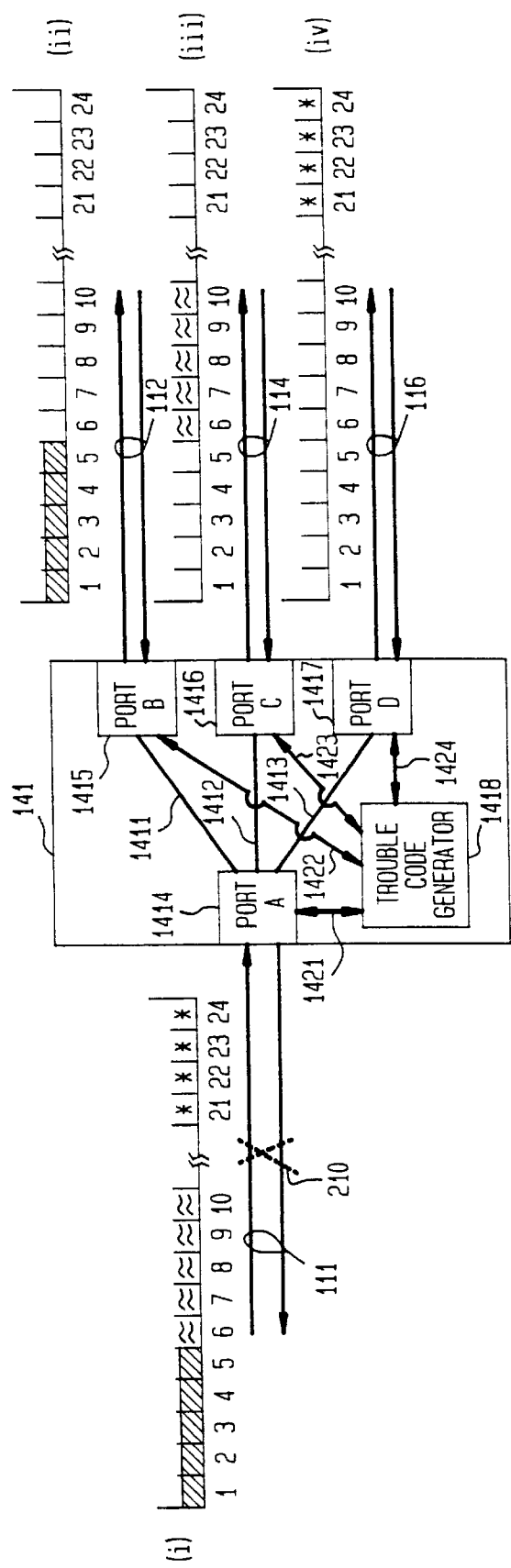
FIG. 2 depicts an exemplary prior art DACCS incorporating a DACCS "trouble code" generator to insert DACCS "trouble codes" into outgoing DS0's which are cross connected to a DS1 port detecting a facility failure.

FIG. 2, which focuses on an arrangement for DACCS 141 shown in block diagram form, depicts that incoming DS0s, numbered 1 through 24 on line (i), are cross-connected in the following manner: (1) DS0s 1–5 are routed from port 1414 (Port A) to port 1415 (Port B) via cross-connect bus arrangement 1411, as further depicted on line (ii); (2) DS0s 6–15 are routed from Port A to port 1416 (Port C) via cross-connect bus arrangement 1412, as further shown by line (iii); and (3) DS0s 16–24 are routed from Port A to port 1417 (Port C) via cross-connect bus arrangement 1413, as further illustrated by line (iv). In addition, DS1 links 111, 112, 114, and 116 are connected to Ports A–D, respectively. The bi-directional nature of each 0of these links is shown by directional arrows on the two one-way links comprising each single bi-directional link. A full complement of DS0s in each DS1 link is not shown for simplicity. It should also be noted that DS0s 1–5 in line (i) do not necessarily have to be placed into DS0s 1–5 in line (ii); they may be placed in any DS0 slots, so what is shown is merely illustrative.

If a failure occurs in DS1 link 111, as shown by large dashed "X" 210, then port A senses the loss of signal on the incoming DS1 link and instructs the "trouble code" generator circuitry 1418 to place a "trouble code" in all the outgoing DS0s which are cross-connected to the DS1 port reporting the failure, namely, Port A. Trouble code generator 1418 is connected to all DS1 ports in the DACCS, including Ports A, B, C and D. DACCS may have a few hundred DS1 ports; Ports A, B, C, and D are merely illustrative. The "trouble code" generator is connected to Ports A, B, C, and D via respective leads 1421, 1422, 1423 and 1424. With this arrangement, the outgoing DS1 link 112 has DACCS "trouble codes" in DS0s 1–5, as shown cross-hatched on line (ii). Similarly, DS0s 6–15 of link 114 propagate DACCS "trouble codes" as depicted by the "wavy" line symbols on line (iii). Finally, DS0s 16–24 of DS1 link 116 propagate DACCS "trouble codes" as depicted by the "asterisk" symbols on line (iv). Such DACCS "trouble codes" would also be transmitted if a hardware failure occurred in Port A of DACCS 141 that precluded the DACCS from passing information through Port A. The purpose of the DACCS-generated "trouble code" is to inform downstream terminal equipment, such as channels banks 132–134 in the example above, of a failure of a particular DS0. In the above example, upstream equipment, such as channel bank 131, senses the loss of signal due to the break in DS1 link 111.

By way of an illustrative example of DACCS "trouble codes", it is usually necessary to distinguish a DS1 information frame from a signaling frame. Five out of every six DS1 frames are information frames. In the information frames, each DS0 time slot contains eight information bits; the DACCS "trouble code" is a pre-defined, though user changeable, eight-bit pattern (e.g. the DACCS TRB code is "11100100") with the right-most bit being the least significant bit. In the signaling frames, each channel time slot contains seven information bits and one signaling bit; the same "trouble code" in this case is "1110010X", where "X" indicates a "do not care" state. (The least significant bit is used for signaling.)

B. Specifics of the Present Invention

Figure 3:
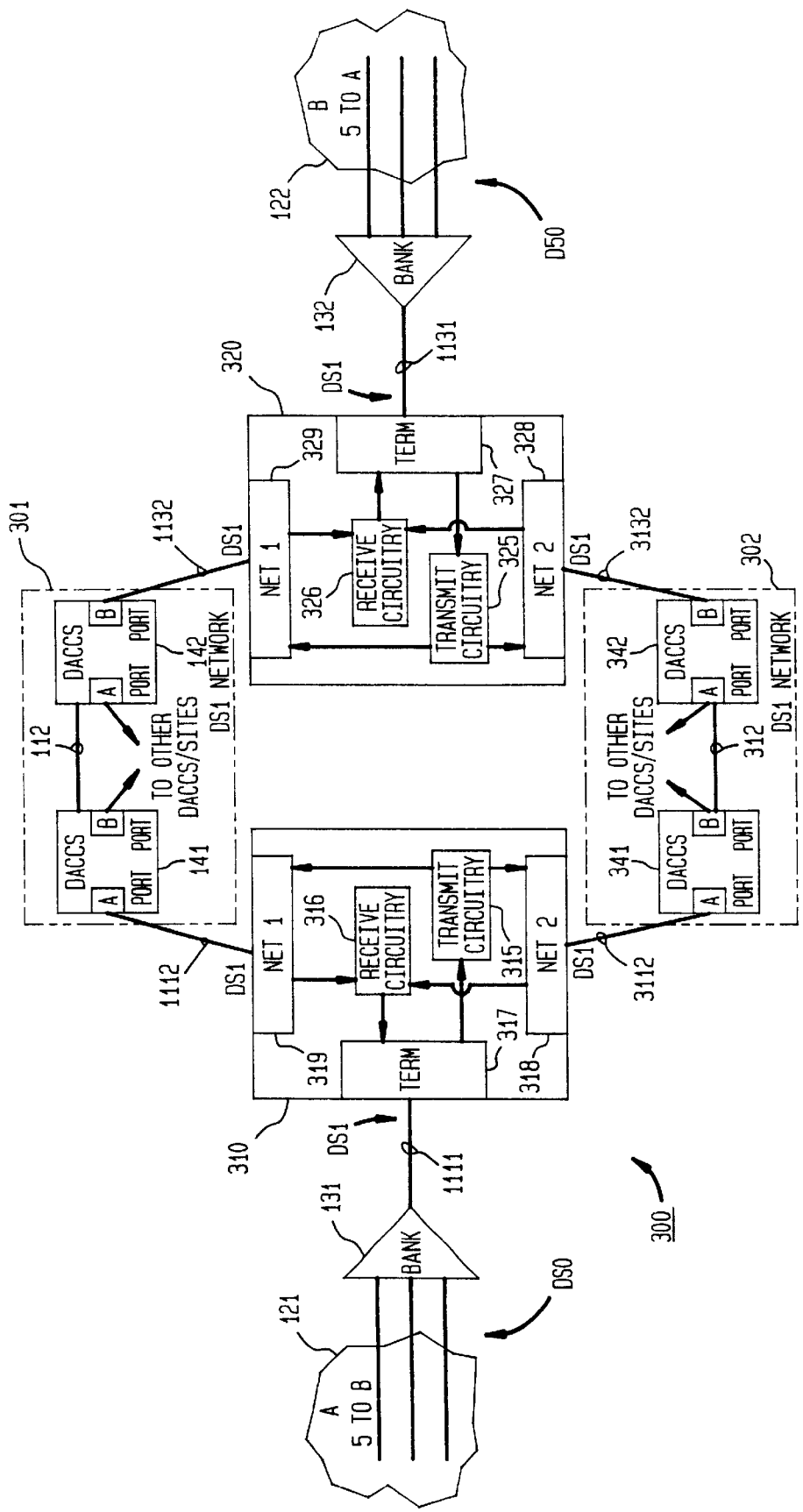
FIG. 3 illustrates a digital network in accordance with the present invention wherein two customer sites are interconnected by an arrangement of channels banks and DACCSs coupled by interposed DS1 facilities, and including protection devices which interconnect primary and secondary facilities that serve as alternate propagation paths.

As shown in FIG. 3, digital network 300, which is illustrative of an embodiment of the present invention, is arranged so that two customer sites 121 and 122 (sites A and B) communicate with each other utilizing a pair of protection devices 310 and 320 to protect against loss of communication due to a facility fault condition(s). Sites A and B are coupled to network 300 by digital channel banks 131 and 132, respectively; consistent with the example of FIG. 2, five DS0s originating at site A are destined for site B and vice versa. Generally, each channel bank and associated device are both customer premises equipment, i.e., both are typically located at corresponding customer sites A and B. For example, channel bank 131 and device 310 are both co-located at site A.

Device 310 is coupled to channel bank 131 via interposed DS1 link 1111; the connection of link 1111 to device 310 occurs on Terminal (TERM) port 317. In turn, device 310, through Network 1 and Network 2 (NET 1 and NET 2) ports 319 and 318, connects to two independent DS1 networks 301 and 302 via DS1 links 1112 and 3112, respectively. Networks 301 and 302 provide redundant communication paths for signal propagation between sites A and B. Network 301 is the primary or active network which is typically supplied by a primary inter-exchange carrier, whereas network 302 is secondary or backup network which is supplied by another, independent inter-exchange carrier. Network 301 is primary in the sense that it is the network of preference whenever network 300 is initially brought on-line. Network 301 in this illustrative embodiment is composed of DACCS pair 141 and 142 as well as DS1 link 112 interconnecting this DACCS pair. Typically, DACCS 141 and 142 connect to other DACCS and customer sites (not shown). Similarly, network 302 is composed of DACCS pair 341 and 342 as well as DS1 link 312 interconnecting this DACCS pair as well as other DACCS and sites (not shown).

Device 320, through its NET 1 and NET 2 ports 329 and 328, connects to networks 301 and 302 via interposed DS1 links 1132 and 3132, respectively. TERM port 327 of device 320 terminates one end of link 1131, with the other end of link 1131 being connected to channel bank 132.

Device 310 is arranged with transmit circuitry 315 which receives inputs from corresponding TERM port 317 and generates two identical copies of the DS1 signal generated by channel bank 131, including the five DS0s destined for site B. In turn, these two copies are then transmitted simultaneously from transmit circuitry 315, via NET 1 and NET 2 ports 319 and 318 of device 310, over primary and alternate (secondary) networks 301 and 302. Similarly, device 320 is arranged with transmit circuitry 325 which receives inputs from associated TERM port 327 and generates two identical copies of the DS1 signal generated by channel bank 132, including the five DS0s destined for site A. In turn, these latter two copies are then transmitted simultaneously from transmit circuitry 325, via NET 1 and NET 2 ports 329 and 328 of device 320, over primary and secondary networks 301 and 302.

To exemplify the restoration operation of devices 310 and 320 in order to preclude outages of channels connecting sites A and B (except for a momentary, transitory restoration interval), a failure in DS1 link 112 (located within primary DS1 network 301) is considered. Prior to the failure, it is presumed that network 301 is active, and network 302 operates in a backup mode. Thus, the actual propagation path of the five DS0s emanating from site A to site B, and vice versa, is over network 301 via the electronic coupling of each TERM port with each associated NET 1 port. Failure of link 112 causes a loss of the DS1 signal normally arriving: (i) on Port A of DACCS 142 for propagation in the direction from site A to site B; and (ii) on Port B of DACCS 141 for propagation from site B to site A. Both DACCS 141 and 142 detect the failure of DS1 link 112 and, in response, insert a DACCS "trouble codes" in each DS0 cross-connected to Port A of DACCS 142 and Port B of DACCS 141 including the five DS0s propagating on links 1112 and 1132. These DS0s with DACCS "trouble codes" arrive at the NET 1 ports of devices 310 and 320. Device 310 is arranged with receive circuitry 316 to detect these manifestations of the failure, namely, the DACCS "trouble codes", arriving at corresponding NET 1 port 319 from DACCS 141. If a DACCS "trouble code" is present in any of the DS0s for a predetermined interval, typically 100 milliseconds, receive circuitry 316 first checks the information bits in the corresponding alternative DS0 of the other DS1. If that DS0 does not contain the DACCS "trouble code" pattern, the device initiates a switchover to the alternate path. Thus, in this particular case, receive circuitry 316 responds by selecting the five DS0s propagating on alternate network 302 as the active DS0s, that is, device 310 selects the five DS0s from its NET 2 port 318 rather than its NET 1 port 319. Each device operates independently of the other. Since link 312 (the counterpart to link 112) is presumably operational, communication between site A and site B is re-established after the momentary switching transient. Independently, device 320 is arranged with receive circuitry 326 to detect these DACCS "trouble codes" arriving at corresponding NET 1 port 329 from DACCS 142 and respond in a manner similar to receive circuitry 316.

As alluded to above, before any switchover occurs, each device 310 or 320, through its respective receive circuitry 316 or 326, ensures that a DACCS "trouble code" is present for 100 milliseconds. If so, then the receive circuitry checks to determine if the information bits in the corresponding DS0s in the backup network have been free of a DACCS "trouble code" in a preselected interval, such as the last 10 milliseconds preceding the end of the 100 millisecond interval. Again, if so, then each device initiates the switchover to the backup network. The channels with the DACCS "trouble codes" are declared as having an "unavailable" status. This status is subsequently removed if the DACCS "trouble code" is no longer present for a given time interval, such as 1 second. However, even though the "unavailable" status may be removed, the backup network now becomes the active network, whereas the previously active network now becomes the backup network. In this example, network 301 was originally active, but remains as the backup network even after link 112 is cleared of its fault condition.

As another example of the manner of system restoration, an outage in link 1132 is now considered. In this case, device 310 switches on the DACCS "trouble code" whereas device 320 switches all 24 DS0s to alternate network 302 based on the loss of the incoming DS1 signal detected at device 320. No DACCS "trouble code" is received at device 320.

Also, it should be pointed out that if any of the DS0s has a DACCS "trouble code", all DS0s in a fractional DS1 channel shall switch.

Figure 4:
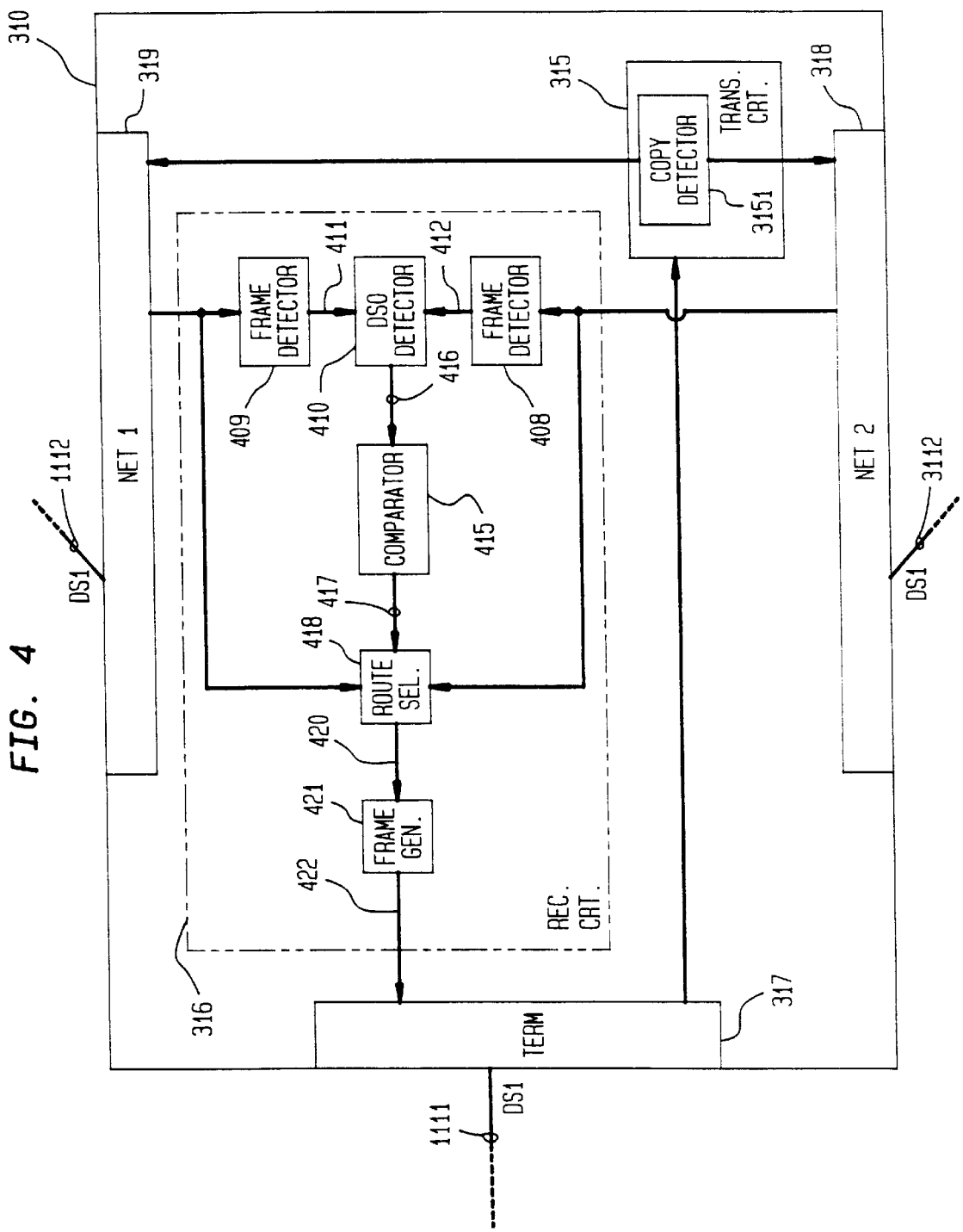
FIG. 4 depicts, in block diagram form, one protection device, including transmit and receive circuit block diagrams for selecting the active channel signals from either the primary or secondary facility.

Continuing with the description of an illustrative embodiment of the restoration circuitry and operational methodology, the details of a single protection device, namely, device 310, are shown in block diagram form in FIG. 4; device 320 is realized with substantially-the same circuitry to effect substantially the same functionality.

In particular and to simplify FIG. 4, only those components that comprise receive circuitry 316 and operate to effect the required testing, selecting, and switching, if necessary, and thereby restore digital telecommunications between sites A and B are explicitly shown. The remaining components that are needed to implement circuitry 316 would be readily apparent to anyone skilled in the art. As depicted, NET 1 and NET 2 ports 319 and 318 supply incoming DS1 signals from networks 301 and 302 to DS0 detector 410 over lines 411 and 412, respectively. In order to properly recover the fractional DS1 channels from each of the incoming DS1 signals, appropriate frame detectors 408 and 409 are required. DS0 detector 410 then supplies two sequences of DS0s, one derived from primary network 301 and the other derived from secondary network 302, to comparator 415 via lead 416. Comparator 415 compares the DS0 signal in the arriving sequences with the known DACCS "trouble codes". Comparison results are passed to route selector 418 via lead 417; the results indicate for the $i^{th}$ DS0, i=1, 2, . . . , 24, which route is to supply the DS0 signal for the given slot. Comparator 415 also includes appropriate circuitry to monitor both the status of each DS0 and each DS1 facility and appropriately change the status of any such channel and facility from being unavailable to available, as set forth above. Incoming DS1 signals serve as inputs to route selector 418. Selector 418 establishes a sequence which specifies which route has been selected for the twenty-four distinct DS0s and then emits the sequence onto lead 420. Frame generator 421 then juxtaposes these distinct DS0s to form each high-rate DS1 frame. The output of frame generator 421, appearing on lead 422, forms the outgoing portion of DS1 link 1111.

Copy generator 3151 situated within transmit circuitry 315 generates the two identical copies of the DS1 signal that is received over DS1 link 1111 and appearing at TERM port 317 and subsequently transmits these copies to NET 1 and NET 2 ports 319 and 318 for carriage over both the primary and secondary networks.

By now those skilled in the art will clearly realize that although the inventive technique has been described in terms of use and incorporation within a private line network and particularly in conjunction with DS1 links carrying fractional DS1 channels, its use is not so limited. In fact, this technique can be used in conjunction with any of a wide variety of bi-directional multiplexed communication systems to provide redundant fault tolerant communication in the event of a failure of a multiplexed path in that system. For example, such a system could form part of a geographically dispersed telecommunications or other network or could be used within a multiplexed communication system that provides localized communication such as within a data processing facility or other digital system.

Furthermore, although one embodiment of the present invention has been shown and described in detail herein, many other varied embodiments that incorporate the teachings of the invention may be easily constructed by those skilled in the art. Accordingly, use and implementation of the invention is not limited to the specific illustrative embodiment shown herein, but rather by the scope of the appended claims.

What is claimed is:

1. A first terminal for exchanging information with a second terminal over a first communications link and a second communications link wherein the communications links are configured in parallel between the first and second terminals and are operable to transmit the information, and wherein the first communications link is operable to transmit a fault indication signal upon detection of a fault condition affecting the first communications link, the first terminal comprising:

a transmitting means for simultaneously transmitting duplicate information to the second terminal over the first communication link and the second communication link; and a receiving means for receiving duplicate information from the second terminal over the first communication link and the second communication link, for monitoring the information from the first communications link to detect the fault indication signal, and for replacing the information from the first communications link with corresponding information from the second communications link upon detection of the fault indication signal.

2. The terminal of claim 1 further comprising a testing means for testing the information from the second communications link to detect the fault indication signal for a pre-determined time.

3. The terminal of claim 2 wherein the receiving means does not replace the information from the first communications link if the testing means detects the fault indication signal in the information from the second communications link for the predetermined time.

4. The terminal of claim 1 wherein the receiving means does not replace the information from the first communications link unless the fault indication signal is detected in the information from the first communications link for a pre-determined time.

5. The terminal of claim 1 wherein each communications link is further operable to transmit on a plurality of channels, wherein the transmitting means is also for transmitting duplicate information on corresponding channels in the first communication link and the second communications link; wherein the first communications link is further operable to transmit the fault indication signal on a particular group of channels upon detection of a fault condition affecting at least one of the channels in the particular group; and wherein the receiving means is also for monitoring each channel in the first communications link to detect the fault indication signal and replacing information containing the fault indication signal with duplicate information from the corresponding channel in the second communications link.

* * * * *